2,956,995
CONTINUOUS PROCESS FOR THE PRODUCTION OF ALIPHATIC MONOOLEFIN POLYMERS

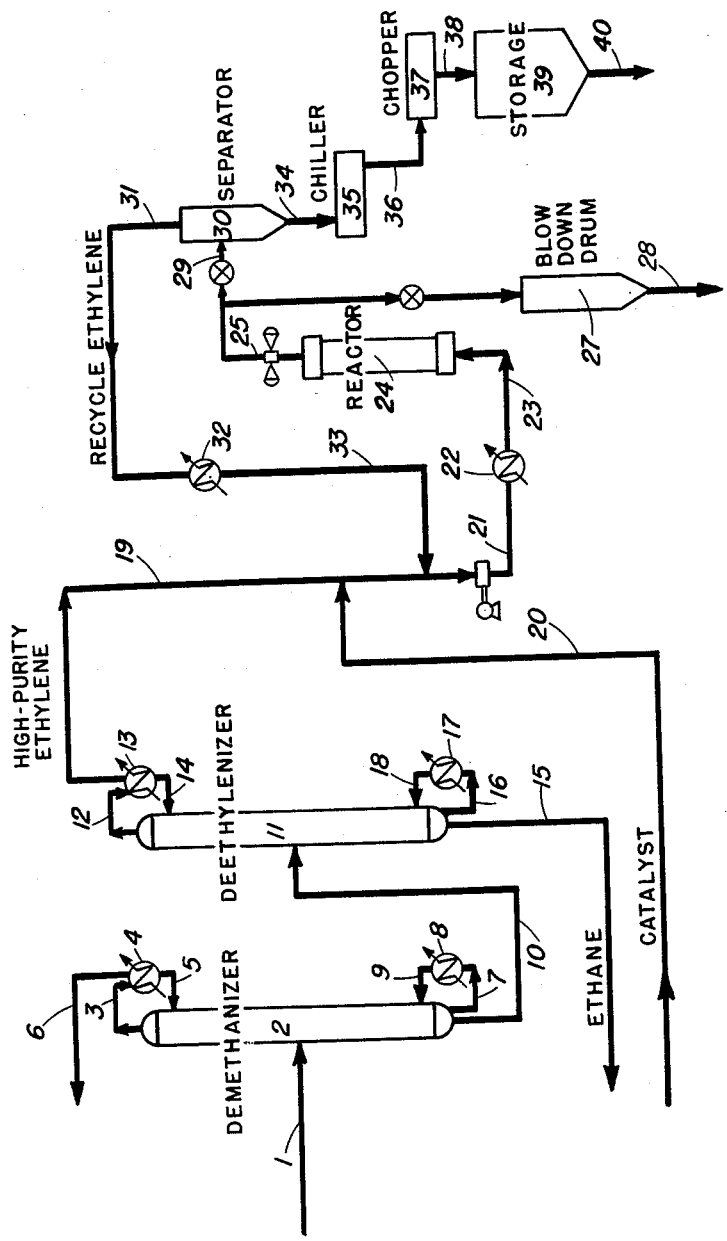

Ralph M. Knight, Greenwich, Conn., assignor to National Distillers and Chemical Corporation, a corporation of Virginia Filed June 28, 1956, Ser. No. 594,468

2 Claims. (Cl. 260—94.9)

This invention relates to an improvement in the manufacture of solid, high molecular weight polymer products from ethylenically unsaturated hydrocarbons and relates particularly to improvements in the process for the polymerization of ethylene.

Various methods have been proposed for the polymerization of olefins such as ethylene with the principal object of obtaining high molecular weight products for various purposes. Oil-like products of relatively low molecular weight have been prepared from ethylene by its polymerization in the presence of acidic type catalysts such as aluminum chloride or boron trifluoride while solid to semi-solid high molecular weight products of a polymeric nature have been obtained by polymerization in the absence of catalysts or in the presence of peroxygen-type, and other suitable catalysts by treatment at pressures above 200 atmospheres and up to 3000 atmospheres or more.

This improved process is principally concerned with the manufacture of solid polymers of the type just described. In the preparation of high molecular weight polymers of olefinic hydrocarbons containing an ethylenic linkage and more especially in the polymerization of ethylene and the preparation of high molecular weight polymers of ethylene with other organic compounds, in the presence of peroxygen-type or no catalysts, the reaction is conducted under very high pressures which may extend up to 4000 atmospheres and above. For example, the ethylene or other olefinic hydrocarbons are brought to reaction pressure by multistage compression as is described hereinafter in greater detail or reaction pressure can be reached by first compressing the gas to approximately its critical pressure, and for ethylene preferably to a pressure between 20 and 150 atmospheres, subsequently cooling the thus compressed gases to a temperature sufficient to liquefy them, that is, for ethylene, to a temperature between —35 and +5° C., thereby converting the gas to a liquid, and thereafter raising the pressure of the resulting liquid to the desired reaction pressure. In any case, following the polymerization, the products issuing from the reaction zone are under these pressures which must be released. Efficient and economical operation of the process is effected if the pressure of the reactants issuing from the converter is lowered in one or more steps. Partial pressure let-down results in a separation from the gases present of many of the products formed during the reaction. The gases which constitute principally the olefin used, for example, such as ethylene, are recycled to the system at the let-down pressure, if desired. Liquid and solid polymeric products separated at these pressures can be further let-down to atmospheric pressure at which pressure gases present can also be recycled, if desired.

During the operation of such relatively high pressure polymerizations on a large commercial scale, there frequently occur decompositions during which a number of things may happen. These decompositions may occur relatively slowly or they may build up and occur with explosive violence. In any event, depending on the time, duration, and conditions prevailing, a relatively large quantity of off-specification polymers will be produced within a commercial sized reactor as the direct result of the decomposition. Generally these decompositions are unpredictable and relatively uncontrollable. They may be caused, for instance, by a variety of uncontrolled conditions within the reaction zone such as too high temperatures, pressures, contamination, impure ethylene feed, excessive or impure catalysts, or for any number of unexplained reasons. In general, these "runaway" reactions are handled by automatic or manual release of a number of safety mechanisms and cessation of feed and catalyst supply. However, a large amount of decomposed, partly polymerized, overpolymerized, or otherwise unsalable materials remain in the reactor as well as in the pipes, valves, and mechanical parts of the plant associated therewith. Normally and in conventional operation, this mass of material is passed through the pipes, valves, coolers, pressure let-down devices, conditioning, chopping and shredding equipment, and storage in order to be eliminated from the system. Thus the entire reactor, separation, and recovery system become contaminated with the off-grade, poor quality polymer and extended periods of operation under normal conditions are necessary in order to clean out and recondition the reactor and recovery system and thereby obtain No. 1 quality polymer product. Thus, valuable feed and catalyst materials are lost, operation time is curtailed, production schedules are delayed, and, among the most serious problems, the equipment and storage systems are fouled and contaminated.

It has been discovered that all these disadvantages can be overcome and spontaneous decompositions handled on a plant scale with a minimum of material and time loss. This is done by an improved process in which there is included at least one additional tank which may be designated as a blow-down drum or tank suitably equipped with pressure release lines and valving and with outlet lines for emptying and cleaning. Such drum or tank should be of sufficient capacity to accommodate any amount of undesirable polymer formed or accumulated during decompositions. The amount of piping and valving should be kept to a minimum to facilitate emptying and cleaning.

Thus, when a decomposition occurs, the valves from the reactor to the regular separation and recovery equipment are closed and the valves to the special blow-down drum are opened. Meanwhile, the polymerization reaction is quenched as quickly as possible. The decomposed material is then washed and extracted from the reactor and lines directly to the blow-down drum. When removal is complete, the valves are adjusted to normal operation, the polymerization reaction is started and the reactor put back on stream.

The polymerization reaction itself as described herein may be carried out in accord with the reaction in any suitable type of converter capable of withstanding the high pressures.

The peroxygen-type catalyst which may be employed with the reaction includes molecular oxygen or air which may be present with respect to the olefin in amounts ranging from 5 to 2000 P.P.M. (calculated as oxygen). While oxygen is the preferred catalyst other peroxygen-type catalysts may be used, alone or with oxygen, such catalysts including diethyl peroxide, hydrogen peroxide, persuccinic acid, lauroyl peroxide, tetraline peroxide, urea peroxide, butyryl peroxide, benzoyl peroxide, alkali metal and alkaline earth metal and ammonium persulfates, perborates, percarbonates and the like, the peroxygen type catalysts being preferably used at lower operating temperatures.

The amount of peroxide catalysts used may vary over a wide range from 0.1 to 5% by weight based on the ethylene or higher.

The polymerization reaction may be conducted with any polymerizable aliphatic monoolefinic hydrocarbon by which is meant one that can be converted to a polymer in the presence of the aforesaid and like catalysts under the pressure and temperature conditions designated. Ethylene, propylene and isobutylene are the most prominent hydrocarbons of this class and of these most important is ethylene.

The polymerization is not limited solely to the polymerization of the aforesaid hydrocarbons for it is known that ethylene can be interpolymerized with a variety of unsaturated compounds such as propylene, isobutylene, styrene, and similar monoolefinic hydrocarbons, vinyl esters, such as vinyl acetate, vinyl formate, and vinyl isobutyrates, as well as such acids as acrylic, methacrylic, itaconic, crotonic, and fumaric as well as their derivatives such as esters, acid halides, amides and anhydrides. Ethylene forms valuable interpolymers with vinyl chloride, vinylidene chloride, vinyl cyanide and N-vinyl amides, vinyl ethers, divinyl formal, divinyl butyral and methyl vinyl ketone. This olefin will likewise form high molecular weight products in the presence of a number of compounds such, for example, as the halogenated aliphatic hydrocarbons; saturated aliphatic or aromatic acids, esters, anhydrides, aldehydes, alcohols, ethers and so forth; and with sulfonyl halides, and sulfur halides.

*Example 1*

This invention will be more readily understood by reference to the attached diagrammatic drawing, which is presented as a particular embodiment of the invention but is not intended to limit the invention in any way thereto.

A $C_1$-$C_2$ gas stream such as is obtained from refinery operations and containing ethylene is passed via feed line 1 into a demethanizer fractionating tower 2. A vapor stream consisting primarily of methane is removed from the upper, preferably the top, of tower 2 via line 3. This vapor stream is passed through condenser 4 wherein it is condensed to a liquid stream. A part of this liquid methane-containing stream is removed via line 6, and a part returned to tower 2 as reflux via line 5. The demethanized $C_2$ stream is removed as a liquid from the lower portion of tower 2 via line 10. A relatively small portion of this liquid is removed from the tower via line 7, passed to reboiler 8, and returned to tower 2 via line 9 to supply heat thereto.

The demethanized $C_2$ stream is then passed via line 10 into the mid-portion of a deethylenizer fractionating tower 11. From the lower portion of tower 11, there is removed a liquid stream consisting primarily of ethane via line 15. A part of the liquid from the lower portion of the column is removed by line 16, passed through reboiler 17 and thence returned to tower 11 via line 18 to supply heat. A vapor stream consisting of high purity ethylene (97.5–99%) is removed from the upper portion of tower 11 via line 12. This vapor stream is condensed to liquid in condenser 13. A part of the condensate is returned via line 14 as reflux to tower 11. The remainder of the condensed high-purity ethylene stream is passed from condenser 13 via line 19, through suitable pumps to bring the pressure by multi-stage compression up to the operating pressure of the polymerization reactor. The catalyst or catalysts if used are preferably injected into feed line 19 by catalyst line 20. For instance, total oxygen either as such or as oxygen equivalents or yielding peroxy compounds such as peroxides, persulfates and the like can be in the range of 5 to 2000 p.p.m. of ethylene feed. The high pressure, high purity ethylene (preferably 500–2000 atms.) after passing through the pressuring pumps, is passed via line 21 through gas cooler 22 to adjust the temperature of the gas in the range of 0 to 150° C. and thence via line 23 into high pressure reactor 24. In reactor 24, using the appropriate polymerization conditions, with pressures preferably in the range of 800 to 1500 atmospheres and temperatures preferably in the range of 100–300° C., the high purity ethylene undergoes polymerization to form semisolid or solid polyethylene polymer. If the system is functioning normally then the product polymer and unreacted ethylene is passed from reactor 24 via outlet pipe 25 through one or more pressure let-down valves and thence via line 29 suitably equipped with control valves which are open during normal operations and into gas separator 30 of which there may be one or more in series. The unreacted high purity ethylene gas is separated therein and passed via line 31, gas cooler 32, and line 33 into high purity ethylene feed line 19 and thence into reactor 24. The solid polyethylene polymer remaining in separator 30 is passed via line 34 into polymer chiller 35 and via line 36 into chopper or shredder 37. After suitable handling and conditioning, the polymer product is passed by line 38 into storage tank 39 from which it may be removed by line 40.

Using the improved process of this invention, if there occurs a sudden, unpredictable, and uncontrollable decomposition, then the valve in line 29 is closed, and the valve in line 26 which remains closed under normal operating conditions, is opened into blow down drum 27. The reactor containing decomposed polymer products of below specification quality and especially dark color, is gas extracted by means of gas introduced through the feed inlet lines, and the entire off-quality contents are passed by way of lines 25 and 26 into blow down drum 27, from whence it can be discarded via outlet line 28.

*Example 2*

During a period of relatively normal plant operations in which No. 1 quality of polyethylene was being made by continuous operations, an unpredictable decomposition occurred in one of the large scale commercial high pressure reactors. As a consequence of such a decomposition, a relatively large amount of dark-colored, off specification polymer was produced before it could be brought under control by stopping the reaction or such production otherwise checked. This material cannot be used as standard quality polymer and small amounts of it present in the reactor, transfer lines, separators, and storage tanks cause serious quality problems and especially color contamination of otherwise standard quality polymer. After suitable adjustment of the relief mechanisms, the reactor was gas extracted for a period of one hour at 300–500° F. and at 12,000 to 15,000 p.s.i. pressure. The decomposed material and the gas extract stream were passed to the blow-down drum 27 situated as described in the Example 1 above. After the extraction was completed, the polymerization reactor was again put on stream by reintroducing feed and starting the reaction. About two and one-fourth hours after restarting the reaction, the polymer production was cut off from the off-grade storage into the production run storage. The color of a sample of this production as measured by quality standards, was again No. 1.

In comparison to the above described handling of decomposition polymer, decomposition product was handled in the conventional manner. Although the conventional manner for cleaning polymer reactors does not include gas extraction with the feed, a comparative test was carried out as follows to determine if this step alone would solve the problem satisfactorily. The description shown below indicates that the gas extraction must be combined with the by-pass step to achieve the good results of the invention. After replacement of the safety valve mechanisms, the reactor containing decomposed products was gas extracted directly to the high pressure separator rather than to the blow down drum as described above. After the polymerization was started, it was necessary to discard entirely the first few hours of production because of the black color of the product. In fact, it was necessary to send off-grade polymer subsequently produced and having serious color contamination for a period of thirty-six hours to the off-grade storage before the polymer production could be safely cut back into the regular production storage.

While there is above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a continuous process for the production of high molecular weight polymers by polymerization of a polymerizable aliphatic monoolefin by a peroxygen catalyst at superatmosphere pressures of about 200 atmospheres in a pressure resistant reaction zone and continuously passing the reaction zone contents to a separation and recovery zone during the course of which polymer production unpredictable and uncontrollable decomposition periods occur in said reaction zone and thereby produce substantial quantities of off-specification material, the improvement which comprises the steps in combination of, upon the initiation of such decomposition periods, immediately discontinuing the hydrocarbon feed to the reaction zone, interrupting the flow from the reaction zone to the separation and recovery zone, passing the entire reaction zone contents including the off-specification material to a stand-by collection zone, for off-specification material, gas extracting with said polymerizable aliphatic monoolefin the reaction zone to said stand-by collection zone to remove entirely the residual off-specification material from said reaction zone, closing the reaction zone to said stand-by collection zone, resuming the flow of hydrocarbon feed to the reaction zone, and continuing the flow from the reaction zone to the separation and recovery zone.

2. In a continuous process for the polymerization of ethylene by a peroxygen catalyst to high molecular weight polymers at pressures from 500 to 2000 atmospheres in a pressure resistant reaction zone and continuously passing the reaction zone contents to a separation and recovery zone during which continuous polymerization unpredictable and uncontrollable decompositions occur and produce off-specifications, lark-colored polymeric products, the improvement which comprises the steps in combination of, upon the onset of such decompositions immediately discontinuing the ethylene feed to the reaction zone, interrupting the flow from the reaction zone to the separation and recovery zone, passing the entire reaction zone contents including the off-specification polymeric products to a stand-by collection zone for off-specification products, gas extracting with ethylene the reaction zone to said stand-by collection zone to remove entirely the residual off-specification polymeric products from said reaction zone, closing the reaction zone to said stand-by collection zone, resuming the flow of ethylene feed to the reaction zone, and continuing the flow from the reaction zone to the separation and recovery zone.

References Cited in the file of this patent

UNITED STATES PATENTS

| | | |
|---|---|---|
| 2,072,801 | Gary | Mar. 2, 1937 |
| 2,455,665 | Ford et al. | Dec. 7, 1948 |
| 2,530,144 | Bannon | Nov. 14, 1950 |
| 2,553,426 | Schutze | May 15, 1951 |
| 2,563,624 | Small et al. | Aug. 7, 1951 |
| 2,728,754 | Evering et al. | Dec. 27, 1955 |
| 2,852,501 | Richard et al. | Sept. 16, 1958 |

OTHER REFERENCES

Perry: "Chemical Engineers Handbook," page 1439 (3rd edition), 1950.